United States Patent [19]

Flanagan

[11] 4,100,377

[45] Jul. 11, 1978

[54] PACKET TRANSMISSION OF SPEECH

[75] Inventor: James Loton Flanagan, Warren, N.J.

[73] Assignee: Bell Telephone Laboratories, Incorporated, Murray Hill, N.J.

[21] Appl. No.: 791,782

[22] Filed: Apr. 28, 1977

[51] Int. Cl.$^2$ ............................................. H04J 6/02
[52] U.S. Cl. ............................................. 179/15 AS
[58] Field of Search ......... 179/15 AS, 15 BA, 15 AL

[56] References Cited

U.S. PATENT DOCUMENTS

| Re. 28,811 | 5/1976 | Pierce | 179/15 |
|---|---|---|---|
| 2,548,661 | 4/1951 | Feldman | 179/15 |
| 2,957,946 | 10/1960 | Kolding et al. | 179/15 |
| 2,961,492 | 11/1960 | Carbrey et al. | 179/15 |
| 3,304,372 | 2/1967 | Filipowsky et al. | 179/15 AS |
| 3,466,398 | 9/1969 | Fraser et al. | 179/15 |
| 3,535,450 | 10/1970 | Vollmeyer | 178/50 |
| 3,644,680 | 2/1972 | Amano et al. | 179/15 AS |
| 3,660,605 | 5/1972 | Rees | 179/15 AS |
| 3,996,583 | 12/1976 | Hutt et al. | 340/324 |
| 4,002,841 | 1/1977 | Ching et al. | 179/15 |
| 4,005,276 | 1/1977 | Abramson et al. | 179/170.2 |
| 4,009,342 | 2/1977 | Fahrenschon | 179/2 |
| 4,048,447 | 9/1977 | Maruta | 179/15 AS |

OTHER PUBLICATIONS

*Electronics International*, 3-17-77, pp. 55-56, "Digital Speech-Interpolation Doubles Capacity of Experimental Phone System".

*Primary Examiner*—Douglas W. Olms
*Attorney, Agent, or Firm*—Robert O. Nimtz

[57] ABSTRACT

A multiplex transmission system is disclosed in which speech activity is detected as a sequence of talkspurts and intervening silent intervals. The speech information is encoded and accumulated in a buffer store by omitting the silent intervals. A time stamp is associated with each talkspurt code burst to permit approximate reconstruction of the talkspurt time structure at the receiver. The talkspurt code bursts are assembled into packets of optimum size for transmission on shared transmission facilities, such as a Time Assignment Speech Interpolation (TASI) system.

The assembled talkspurt packets can be encoded by an adaptive technique responsive to the loading on the transmission facilities and can be transmitted at a rate faster than real-time speech generation to accommodate high-level usage on the shared transmission facilities.

14 Claims, 7 Drawing Figures

PACKET TRANSMISSION OF SPEECH

BACKGROUND OF THE INVENTION

1. Field of the Invention

This invention relates to multiplex signal transmission systems and, more particularly, to the packet transmission of speech on such systems.

2. Description of the Prior Art

It is well known in the art how to use a plurality of transmission channels for transmitting speech signals from a larger plurality of signal sources. The technique is commonly called Time Assignment Speech Interpolation (TASI). In such a system, speech signals in the form of talkspurts are detected and transmitted, as they occur, over any idle and available transmission channel of the plurality. Since normal human speech includes a considerable number of silent intervals between words, phrases, and sentences, as well as silent intervals while listening to the other party, a considerable efficiency can be obtained in the use of the transmission facilities. Indeed, the ratio of the number of speech sources to the number of transmission channels (the TASI advantage) falls between two and three. One such TASI system is shown in A. R. Kolding et al U.S. Pat. No. 2,957,946, granted Oct. 25, 1960. Another type, a "one-man" TASI system, is described in J. L. Flanagan U.S. Pat. No. 3,158,693, granted Nov. 24, 1964.

It is also well known how to transmit coded information on common transmission facilities by assembling such information into packets which compete for common transmission facilities on a first come, first served, basis. Such packets normally include header information identifying the destination of the packet and, in some cases, routing information. Such packet transmission systems have, in the past, been restricted primarily to digital data rather than speech information due to the inability to guarantee delivery of all transmitted signal packets in the correct order and with tolerable delay. One such system is disclosed in J. R. Pierce U.S. Pat. No. Re. 28,811, reissued May 11, 1976.

One of the limiting factors on the utilization of time assignment speech interpolation systems is the necessity to acquire and connect a new transmission channel virtually at once upon the initiation of a new talkspurt. This requirement restricts the loading which can be placed on the common transmission channels to insure the availability of an idle channel for a very large percentage of time. The requirement for always providing an available channel limits the number of speech signal sources which can be connected to the common channels.

Packet transmission systems, on the other hand, assume that all packets will be delivered to their intended destination eventually and that the exact timing of the packet deliveries is not essential to the proper reception of the packets. It is the receiver's job to sort the received packets into the correct temporal order before reconstituting the signal. Such packet transmission systems also require local buffering of the packets during completion for the common transmission facilities and until assignment of the facilities to that particular packet.

SUMMARY OF THE INVENTION

In accordance with the illustrative embodiment of the present invention, speech signals are detected in talkspurt lengths and such talkspurts are encoded. The encoded talkspurts are buffered in a temporary storage medium with the intertalkspurt silent intervals deleted. Each talkspurt is associated with a time stamp indicating the time of initiation of that particular talkspurt. When a sufficient number of talkspurts have been assembled to provide an optimally-sized packet, this packet competes for the use of the common transmission facilities and is assigned to such facilities when they become available.

At the receiving end of the transmission facility, the talkspurt packets are again buffered. Using the time stamps, the talkspurts can be delivered from the receiving buffer at times approximately corresponding to their generation. The coded talkspurts are then decoded and delivered to a listener as intelligible speech.

In accordance with one feature of the present invention, the lengths of the silent intervals, and hence the delivery time of each talkspurt, can be varied over a considerable range without seriously affecting the intelligibility of the delivered speech. This leeway in talkspurt delivery time can be effectively used both to substantially reduce the size of the receiving buffer and to increase the efficiency of the use of the common transmission facilities.

Other techniques which can be applied to a transmission scheme such as that proposed in the present invention include adaptive digital coding techniques which respond, not only to the signal being encoded, but also to the loading on the common transmission facilities. That is, the quality of the digital encoding is varied in accordance with service demands on the transmission facility. Finally, talkspurt packets can be transmitted over the common transmission facilities at a rate faster than original real time to further increase the efficiency of these common facilities.

DETAILED DESCRIPTION

Figure 1:
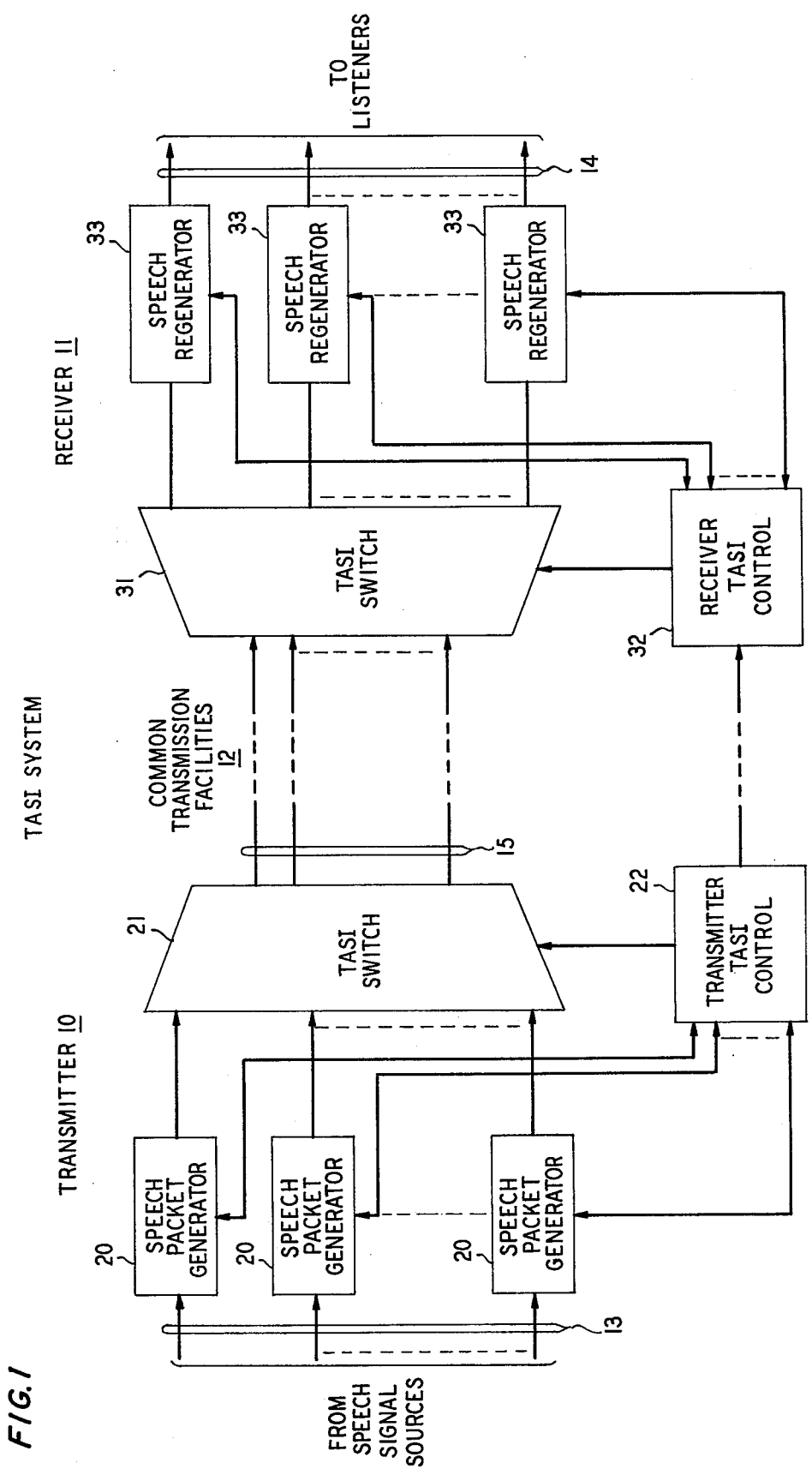
FIG. 1 is a general block diagram of a time assignment speech interpolation system in which the packet transmission of speech is utilized in accordance with the present invention.

Referring more particularly to FIG. 1, there is shown a general block diagram of a Time Assignment Speech Interpolation (TASI) system utilizing the packet transmission of speech in accordance with the present invention. The TASI system of FIG. 1 comprises a transmitter 10, a receiver 11, and common transmission facilities 12. The system is designed to transmit speech from a plurality of input signal lines 13 to an equal plurality of remote listener lines 14 over a lesser plurality of transmission channels 15. Input lines 13 and listener lines 14 can be standard telephone appearances. Common transmission facilities 15 may comprise any transmission facility capable of providing a number of transmission channels less in number than the number of input speech lines 13. Thus, facilities 15 may comprise a plurality of twisted pairs, a frequency division multiplex transmission facility or a time division multiplex transmission facility and may include coaxial cable, microwave, radio, or satellite channels. A common application of TASI systems is on submarine cables where the per channel cost is exceedingly high.

The overall function of a TASI system is to utilize the transmission channels more efficiently by assigning a channel to a speaker only when the speaker is active. During silent intervals, the channel may then be assigned to a different speaker and thereby accommodate a larger number of speakers than the channel could accommodate if the channels were permanently assigned.

In FIG. 1, the transmitter 10 comprises a plurality of speech packet generators 20, each of which, as will be described hereinafter, assembles a segment of speech into a digitally encoded pulse burst which, once assembled, can be launched on the transmission facilities 15. Transmitter 10 also includes a TASI switch 21 and a TASI transmission control circuit 22 which are used to perform the actual switching and control functions to insure unambiguous transmission and reception of the various pulse bursts. The TASI switch 21 and the TASI transmission control circuits 22 may be essentially identical to those shown in A. R. Kolding et al U.S. Pat. No. 2,957,946, granted Oct. 25, 1960, or in Y. C. Ching et al U.S. Pat. No. 4,002,841, granted Jan. 11, 1977.

The receiver terminal 11 includes a TASI switch 31, TASI receiving control circuits 32, and a plurality of speech regenerators 33. Switch 31 complements the connections of switch 21 so as to deliver speech from one of input lines 13 to the corresponding one of output lines 14. Receiver control circuits 22 control these interconnections and perform various other supervisory functions. Switch 31 and control circuits 32 may also be essentially as shown in the above-noted Kolding et al and Ching et al patents.

Figure 2:
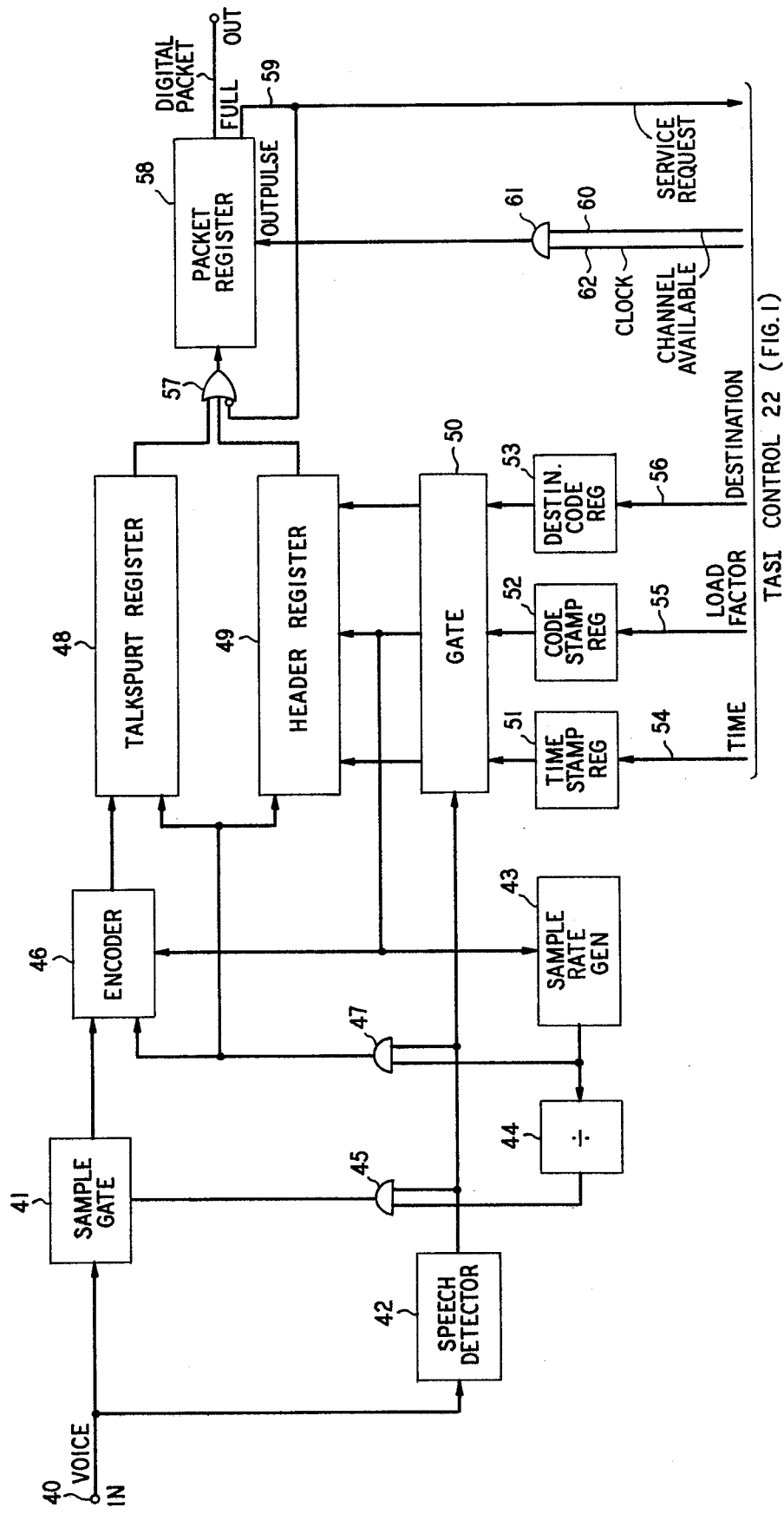
FIG. 2 is a more detailed block diagram of the speech packet generator used in the transmitter of the TASI system shown in FIG. 1.

In FIG. 2 there is shown a detailed block diagram of a speech packet generator circuit useful for the TASI system shown in FIG. 1. In the packet generator of FIG. 2, standard voice signals appear at input terminal 40 and are simultaneously supplied to a sampling gate 41 and a speech detector 42. Speech detector 42 distinguishes between the presence and absence of speech at terminal 40 and generates a bilevel output signal indicating the presence of speech activity at terminal 40.

There are two ways in which the digial encoding quality can be varied: One, by varying the sampling rate of the input speech signal from substantially above the Nyquist rate down to approximately the Nyguist rate (or not much below); and two, by changing the number of bits used to quantize the signal. The first is especially useful for small number of bits of quantization, including delta modulation (which is single bit quantization). The sampling rate variation can be accomplished as follows. Sample gate 41 is under the control of variable sample rate generator 43, the output of which, after pulse division in pulse divider 44, is applied to AND gate 45. The output of speech detector 42 is also applied to AND gate 45 and enables the application of sampling pulses to sampling gate 41.

The encoder circuit 46 is timed by the output of AND gate 47, also enabled by speech detector 42 and supplying variable rate pulses from rate generator 43. Due to the pesence of divider circuit 44, a sample pulse is delivered to gate 41 for every $m$ clock pulses delivered to encoder 46, thus enabling encoder 46 to encode each sample in a multibit pulse code group in accordance with any standard coding technique. The number of bits used for encoding may, of course, be varied, as described above, to achieve a coding quality responsive to moment-by-moment demands on the transmission facility.

The output of encoder 46 is shifted into a talkspurt register 48 under the control of advancing pulses from AND gate 47. Thus, as pulses are generated by encoder 46, they are shifted into talkspurt register 48 and stored therein.

A header register 49, having the same number of storage positions as talkspurt register 48, is utilized to store header information to precede each encoded talkspurt from talkspurt register 48. The header is, of course, much shorter than most actual talkspurts, and register 48 need not hold an entire talkspurt. Resistor 48, indeed, acts merely as a delay to permit header insertion. The header is assembled in register 49 by the operation of gate 50, enabled by the leading edge of the speech activity output of speech detector 42. When thus enabled, gate 50 gates the codes in registers 51, 52, and 53 into header register 49 at the instant of time corresponding to the beginning of each talkspurt. Register 51 contains a time stamp code derived from timing leads 54. The coded signals on lead 54 change regularly with time and represent the current clock time. The timing code which is at that time present in register 51 is gated by gate 50 into header register 49 at the beginning of each talkspurt and thus represents the time at which that particular talkspurt was initiated.

Code stamp register 52 is responsive to a system loading indication on lead 55, indicating the loading level on the transmission system in which the packet generator of FIG. 1 is being used. One such loading factor generator is shown in J. M. Fraser et al U.S. Pat. No. 3,466,398, granted Sept. 9, 1969. The Fraser et al patent discloses a means for generating a so-called "freeze out fraction" signal indicating the number of speakers who are active and not receiving service by the transmission system. This signal is therefore a measure of the loading on the system and can be applied to lead 55.

Each talkspurt header may include a destination code from register 53 which indicates the destination to which that particular talkspurt is addressed. This code, which appears on line 56, is stored in register 53 and, when gate 50 is operated, is transferred to header register 49. The destination code can be affixed to each talkspurt individually or can be affixed only to each packet including a plurality of talkspurts. The capability of applying a destination code to each talkspurt implies the possibility of using a single talkspurt for each packet instead of multiple talkspurts.

Once the header information is assembled in header register 49, the output of AND gate 47 advances this header information through an OR gate 57 into packet register 58. At the same time that header register 49 is being emptied into packet register 58, a coded talkspurt is being assembled in talkspurt register 48. Since these registers are of the same size, once header register 49 has been emptied, talkspurt register 48 has been filled and thus the talkspurt will immediately follow the associated header in packet register 58.

Packet register 58 may be of sufficient size to hold a single talkspurt or any number of talkspurts. Indeed, the size of packet register 58 is selected so as to provide optimum transmission capabilities on the common transmission facilities 12 of FIG. 1. This optimum size is a function of the permissible delay in transmission, the ratio of the number of signal sources and transmission facilities, and the overhead involved in processing the header information. This size will therefore vary for different kinds of transmission systems and for different levels of signal activity.

It will be noted that the code stamp in register 52, after being gated by gate 50, is applied to sample rate generator 43 and to encoder 46. This code stamp is used in rate generator 43 to adjust the sampling rate, thereby simultaneously momentarily reducing the quality of the encoded speech but relieving the load on the transmission facilities. This signal can also be used in encoder 46 to adjust the encoding algorithm for the same purposes, i.e., to relieve the load on the system at the cost of some degradation in the encoded voice signal. These two controls, or either one of them, can be used to adjust the signal quality so as to accommodate a larger number of signals on the same transmission facilities during heavy loading.

When a packet register has been filled, a signal on lead 59 inhibits gate 57 and transmits a request for service to the TASI control circuits 22 of FIG. 1. In response to this request for service, the TASI control circuits 22 assign a particular transmission channel to the packet generator of FIG. 2, performing the necessary switching and returning a channel available signal on lead 60. This channel available signal is combined in AND gate 61 with an outpulsing clock signal on lead 62 and the output of gate 61 is used to outpulse the packet from packet register 58. It will be noted that the outpulsing clock rate is totally independent of the input sample rate and thus permits speech packets to be transmitted at a rate faster than they were originally generated. This capability can also be used to reduce the loading on the transmission facilities.

Figure 3:
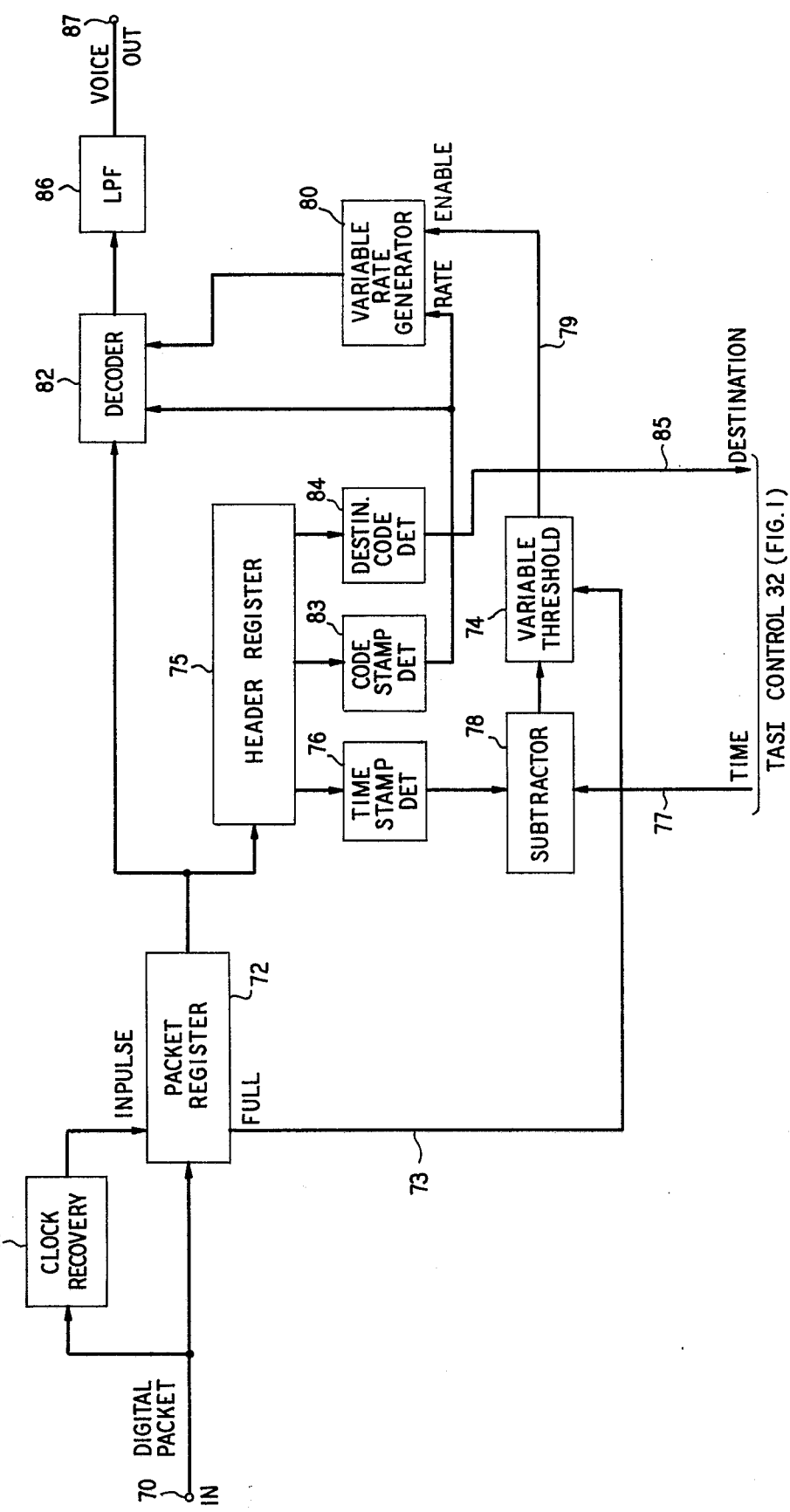
FIG. 3 is a more detailed block diagram of the speech regeneration circuits used at the receiver of the TASI system shown in FIG. 1.

In FIG. 3 there is shown a detailed block diagram of a speech regenerator useful in the TASI system of FIG. 1 and shown there as speech regenerator 33. In FIG. 3 a speech packet is delivered to input terminal 70 and simultaneously applied to a clock regenerator 71 and a packet register 72. packet register 72, in combination with a header register 75, provides sufficient storage capacity to store at least one entire packet, and possibly a number of successive packets. Clock regenerator 71 utilizes the incoming speech packet to generate a timing signal synchronized to the incoming packet. This timing signal is used to impulse the speech packet into packet register 72. When the entire speech packet has been received, a signal appears on lead 73 to enable variable threshold circuit 74. By this time, the header information has advanced into header register 75, and the time stamp is detected by time stamp detector 76. This time stamp is subtracted from a clock signal on lead 77, synchronized with the time signal on lead 54 in FIG. 2, in subtractor circuit 78. The difference is applied to variable threshold circuit 74. When the difference between the time signal and the time stamp exceeds the adjusted threshold, an output signal is produced on lead 79. This output signal enables a variable rate clock generator 80, which, in turn, advances talkspurt signals from packet register 72 to a decoder 82 and simultaneously provides appropriate timing for decoder 82.

Variable rate generator 80 is under the control of the code stamp from code stamp detector 83, connected to header register 75. The code stamp, after detection in detector circuit 83, adjusts the rate of generator 80 to correspond with the rate utilized by generator 43 in FIG. 2. This permits speech to be decoded at the same rate at which it was encoded in the transmitting terminal. The output of code stamp detector 83 is also applied to decoder 82 to adjust the coding algorithm (including the number of bits of quantization) to correspond to that used at decoder 46 in FIG. 2.

The destination code detector 84 provides an output signal on lead 85 which is supplied to the receiving TASI control circuits 32 of FIG. 1 and may be utilized to control the further routing of the received speech signals. The output of decoder 82 is applied to a low-pass filter 86 and thence to a voice output terminal 87.

Figure 4:
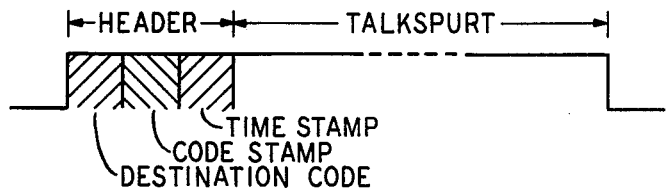
FIG. 4 is a graphical representation of the header and coded voice structure of a single talkspurt.
Figure 5:
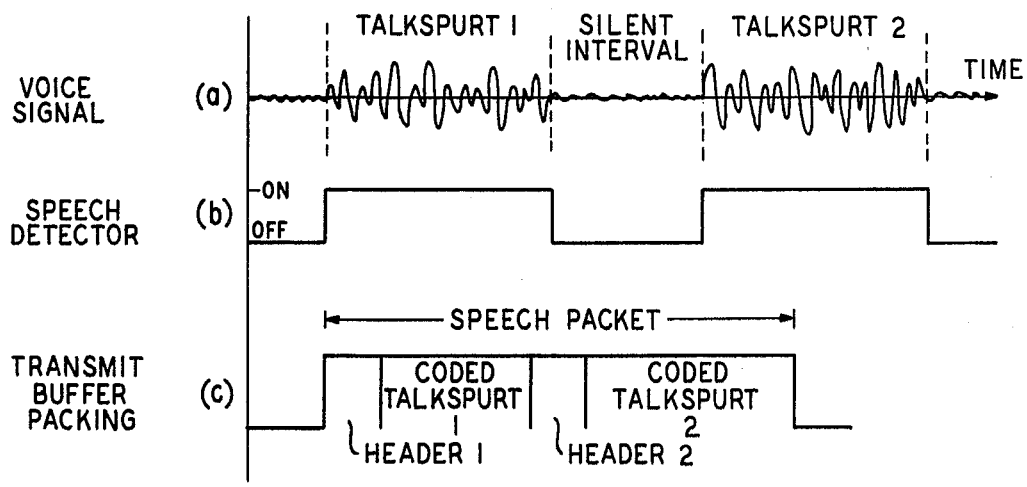
FIG. 5 is a graphical representation of the talkspurts which are digitally encoded into packets and buffered to await transmission, the figure is useful as an aid in understanding the speech packet generating circuits of FIG. 2.

As shown in FIG. 4, the packet generator of FIG. 2 assembles each talkspurt into a coded block comprising a header portion and a talkspurt portion. The header portion further includes a destination code, a code stamp, and a time stamp, all preceding the talkspurt code in time. These talkspurt code groups can be assembled as shown in FIG. 5 into speech packets including more than one talkspurt. Thus, for illustrative purposes only, two talkspurts shown at waveform (a) in FIG. 5 are detected as shown at waveform (b) in FIG. 5, and are assembled into a single speech packet, as shown in waveform (c) of FIG. 5. It will be noted that the silent interval between the first and second talkspurts has been squeezed out of the speech packet at waveform (c). Removal of these silent intervals prior to transmission improves the efficiency of use of the transmission facilities, as well as permitting the assembly of more optimally-sized speech packets. Only two talkspurts have been assembled into a packet in the illustration of FIG. 5. It is clear, however, that any number of successive talkspurts could be similarly assembled and a speech packet of virtually any size generated. It should be noted that the overhead cost of the header is very small since the length of the header, on the average, is very much smaller than the length of a talkspurt.

Figure 6:
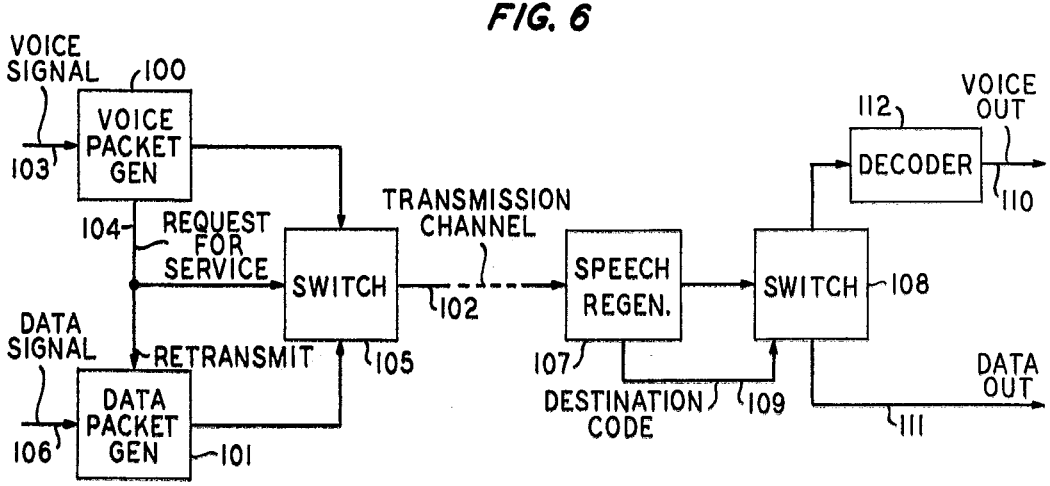
FIG. 6 is a general block diagram of a mixed transmission system in which speech packets and data packets compete for common transmission facilities, using the speech packet techniques of the present invention.

In FIG. 6 there is shown another application for the voice packet generator disclosed in FIG. 2. In FIG. 6, the voice packet generator 100 is used in combination with a data packet generator 101 to share a single transmission facility 102. Thus, voice signals on lead 103 are applied to voice packet generator 100 which may be implemented as shown in FIG. 2. When a voice packet has been assembled, a request for service on lead 104 operates a switch 105 to transmit the voice packet on transmission facility 102. In the intervals between requests for voice service, the transmission facility 102 is used to transmit data packets, assembled in data packet generator 101 from data supplied on input lead 106. Switch 105 normally connects data packet generator 101 to transmission facility 102. When a voice packet is ready for transmission, the signal on lead 104 operates switch 105 to interrupt the transmission of the data packet and simultaneously directs data packet generator 101 to retransmit the data packet which was interrupted when the transmission facility 102 is again available.

Voice and data packets are therefore interleaved and share the same transmission facility. In this way, voice signals have priority of data signals and interrupt the transmission of such data signal whenever required. Typically, the data transmission rate will be slower than the voice transmission rate. Practical values might be 4.8K bits/second and 24K bits/second, respectively.

At the receiving terminal, a speech regenerator 107, which may be implemented as shown in FIG. 3, retimes the speech signals and delivers them to switch 108. Switch 108 is under the control of the destination code signal on lead 109, derived from the header of the received packet. When a speech packet has been received, switch 108 operates to connect regenerator 107 to decoder 112 and thence to voice output line 110. At all other times, regenerator 107 is connected to data output line 111. It can thus be seen that the multiplex transmission system of FIG. 6 accommodates both voice and data signals simultaneously and achieves reasonable economy of transmission by assembling the voice signals into optimally-sized packets for interspersing between data signals.

Figure 7:
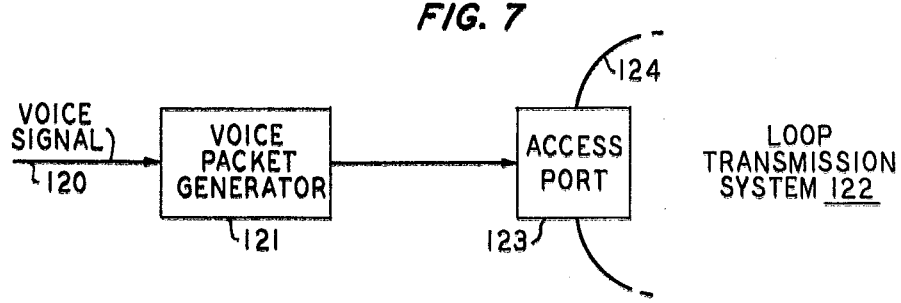
FIG. 7 is a block diagram of a voice packet generator used with a loop transmission system.

In FIG. 7 there is shown yet another application of the voice packet generator illustrated in FIG. 2. Voice signals on input lead 120 are applied to a voice packet generator 121 which assembles the voice signal into digitally encoded packets as described above. These packets can then be launched on a loop transmission system 122 by applying them to an access port 123. One such loop transmission system is disclosed in J. R. Pierce U.S. Pat. No. Re. 28,811, reissued May 11, 1976. In the Pierce system, the access port is identified as a "B-station" and serves to assign packets to available time on a common transmission facility 124. As taught in the Pierce reissue patent, the header information can be used for routing packets through a multiple loop system to the ultimate destination. In this way, loop transmission systems can be used to accommodate voice signals as well as data signals.

The voice signals can be reassembled at the receiving terminal with reasonable speech quality by using time stamps included in the packet headers. Moreover, delays in the transmission time for each packet can be compensated for by using these same time stamps to reassemble the speech talkspurts in real time in a reasonable approximation of silent interval durations. The silent interval durations, however may be adjusted, typically by as much as ±50 percent or more, and still provide acceptable quality of speech. Indeed, it is the ability to modify the duration of silent intervals in the reconstructed signal that makes it possible to transmit speech with high efficiency over packet transmission systems. In addition, the ability to modify the durations of the silent intervals in the reconstruction substantially relaxes the requirements on buffering the speech packets.

The packet generator of FIG. 2 has been illustrated with analog speech detection only for the purposes of convenience. It is clear that input voice signals can be initially encoded and speech detection accomplished by digital techniques. Rather than variably encoding the speech signals, standard PCM codes can be converted, again by digital techniques, into less redundant code formats for assembly into packets.

Finally, in transmission systems where routing is accomplished outside of the signal paths, the destination codes in the headers may be omitted and routing accomplished by other means. This technique is used in the time assignment speech interpolation systems described in the Kolding et al and Ching et al patents.

What is claimed is:

1. A multiplex transmission system for transmitting digital signals from a plurality of signal sources, at least one of which is a speech signal source, on common transmission facilities, said system comprising:
   a speech packet generator for assembling at least one speech talkspurt into a single digital packet;
   means for appending a header block at the beginning of each said digital packet, said header block including a time code indicating the time at which the appended talkspurt was initiated; and
   means for launching said digital packet on said multiplex transmission system.

2. The multiplex transmission system according to claim 1 wherein said speech packet generator includes:
   means for assembling at least two of said speech talkspurts in immediate juxtaposition with the intervening silent period omitted.

3. A speech packet generator comprising:
   a source of speech signals;
   a speech detector connected to said source;
   a digital encoder connected so said source through a sampling gate;
   a packet storage medium connected to said encoder;
   means responsive to said speech detector for enabling said encoder and the input to said storage medium;
   a time stamp generator;
   means for storing a time stamp from said generator in said storage medium; and
   means responsive to the contents of said storage medium for enabling the output of said storage medium.

4. The speech packet generator according to claim 3 wherein said digital encoder includes means for varying the quality of coding in said encoder.

5. The speech packet generator according to claim 3 further including variable clock generating means connected to said sampling gate.

6. A time assignment speech interpolation system comprising:
   a plurality of speech sources;
   an equal plurality of signal utilization means;
   a lesser plurality of signal transmission channels interconnecting said sources and said utilization means;
   means for assembling packets of speech information signals from each of said sources with at least one silent interval deleted;
   means for associating time of initiation signals with said speech information signals;
   means for assigning said packets to available ones of said transmission channels for the duration of said packets;
   means responsive to said time of initiation signals for reinserting said silent intervals; and
   means for delivering said speech information signals with silent intervals reinserted to the proper one of said utilization means.

7. The time assignment speech interpolation system according to claim 6 further including:
   a variable speech sample rate generator;
   means responsive to the loading on said system for adjusting the rate of said generator; and
   means responsive to said loading for associating a loading level signal with said speech information signals.

8. The time assignment speech interpolation system according to claim 6 further including:
   a variable speech encoder for encoding said speech information signals in accordance with any one of a plurality of coding algorithms;
   means responsive to the loading on said system for selecting one of said coding algorithms; and
   means responsive to said loading for associating a loading level signal with said speech information signals.

9. The time assignment speech interpolation system according to claim 6 wherein each said packet assembling means comprises:
   a talkspurt register for storing speech talkspurts in the order in which they are generated by said speech sources;
   a header register for storing said time of initiation signals; and
   a packet register for storing the contents of said header register and said talkspurt register in sequence.

10. A multiplex transmission system for transmitting speech and data signals comprising:
    means for assembling packets of speech information signals with at least one silent interval deleted;
    means for associating a time of initiation signal with said speech information signals;
    means for assembling packets of data information signals;
    means for transmitting said packets of speech information signals when assembled; and
    means for transmitting said packets of data information signals at all other times.

11. The multiplex transmission system according to claim 10 further including:
    means for retransmitting packets of data information signals interrupted by the transmission of assembled packets of speech information signals.

12. The multiplex transmission system according to claim 10 further including:
    means for associating destination signals with each of said speech packets and each of said data packets; and
    means at the remote end of said transmission system, responsive to said destination signals, for delivering said speech packets to a different destination than said data packets.

13. A multiplex loop transmission system for transmitting speech signals comprising:
    means for assembling packets of speech information signals with at least one silent interval deleted;
    means for associating a time of initiation signal with said speech information signals;
    a loop transmission facility; and
    means for transmitting said packets of speech information signals, when assembled, on said loop transmission facility.

14. The multiplex loop transmission system according to claim 13 further including:
    means for associating destination signals with each of said speech information packets.

* * * * *